United States Patent
Park et al.

[11] Patent Number: 5,825,574
[45] Date of Patent: Oct. 20, 1998

[54] AUTOMATIC REVERSIBLE TAPE RECORDER

[75] Inventors: Hyun Seo Park; Jin Gwan Kim, both of Suwon, Rep. of Korea

[73] Assignee: Samsung Electro-Mechanics Co., Ltd., Kyongki-do, Rep. of Korea

[21] Appl. No.: 760,627

[22] Filed: Dec. 4, 1996

[30] Foreign Application Priority Data

Aug. 27, 1996 [KR] Rep. of Korea .................. 1996-35703

[51] Int. Cl.⁶ .................................................. G11B 15/48
[52] U.S. Cl. .......................... 360/74.2; 360/74.1; 360/69
[58] Field of Search ................................ 360/74.2, 74.1, 360/71, 69

[56] References Cited

U.S. PATENT DOCUMENTS

| 4,031,554 | 6/1977 | Umeda et al. | 360/73.05 |
| 4,567,536 | 1/1986 | Tsuchiya | 360/94 |
| 5,506,741 | 4/1996 | Kido | 360/74.2 X |

FOREIGN PATENT DOCUMENTS

60-138752  7/1985  Japan.

*Primary Examiner*—Muhammad N. Edun
*Attorney, Agent, or Firm*—Lowe Hauptman; Gopstein Gilman & Berner

[57] ABSTRACT

An automatic reversible tape recorder is disclosed in which the functions of the keys for fast forward and rewinding are improved, and the manufacturing and assembling are rendered easier owing to the simple structure of the components. The tape recorder includes first and second manipulation levers 110 and 120 capable of moving back and forth horizontally to make said magnetic head ascend or descend, upon completion of displacements of a certain distance. The tape recorder further includes a locking member 130 for selectively fixing said first and second manipulation levers 110 and 120 upon ascending of said magnetic head due to advancement of said first and second manipulation levers 110 and 120. The tape recorder further includes a tape running direction reversing member 140 installed coaxially with said locking member 130, for being turned as much as a certain amount of angle upon advancing of said second manipulation lever 120, so as to push a program lever 150 (which pushes a cam gear). In the present invention, the functions of FF and REW are improved, and the mentioned functions are carried out in a simple manner. Further, the manufacture and assembling of the tape recorder become easier. Further owing to the simple constitution of the direction reversing member, the price of the tape recorder can be lowered.

7 Claims, 7 Drawing Sheets

AUTOMATIC REVERSIBLE TAPE RECORDER

FIELD OF THE INVENTION

The present invention relates to a tape recorder for use in automobiles, in which the functions of the keys for fast forward, rewinding and reversing are improved with a simple structure. In particular, the present invention relates to an automatic reversible tape recorder which includes first and second manipulation levers for performing horizontal movements, and a direction reversing member with a locking member and a pressing portion formed thereon so as to perform rotating movement by the help of the first and second manipulation levers, so that a tape program lever would be actuated. Consequently, the functions of the keys for fast forward and rewinding are improved, and the manufacturing and assembling are rendered easier owing to the simple structure of the components.

DESCRIPTION OF THE PRIOR ART

Generally, in the known automatic reversible tape recorders, when the user selects one from among fast forward (to be called "FF" below) and rewinding (to be called "REW" below) buttons which are installed side by side horizontally, a tape direction reversing member installed in front of them receives pressure, and a connecting member connected to it is turned as much as a certain angle. Consequently, the tape direction reversing lever is pushed, so that the FF function, the REW function and the reversing function can be selectively executed.

One of the conventional automatic reversible tape recorders is disclosed in Japanese Patent Model Publication No. Sho-60-138752.

Figure 1:
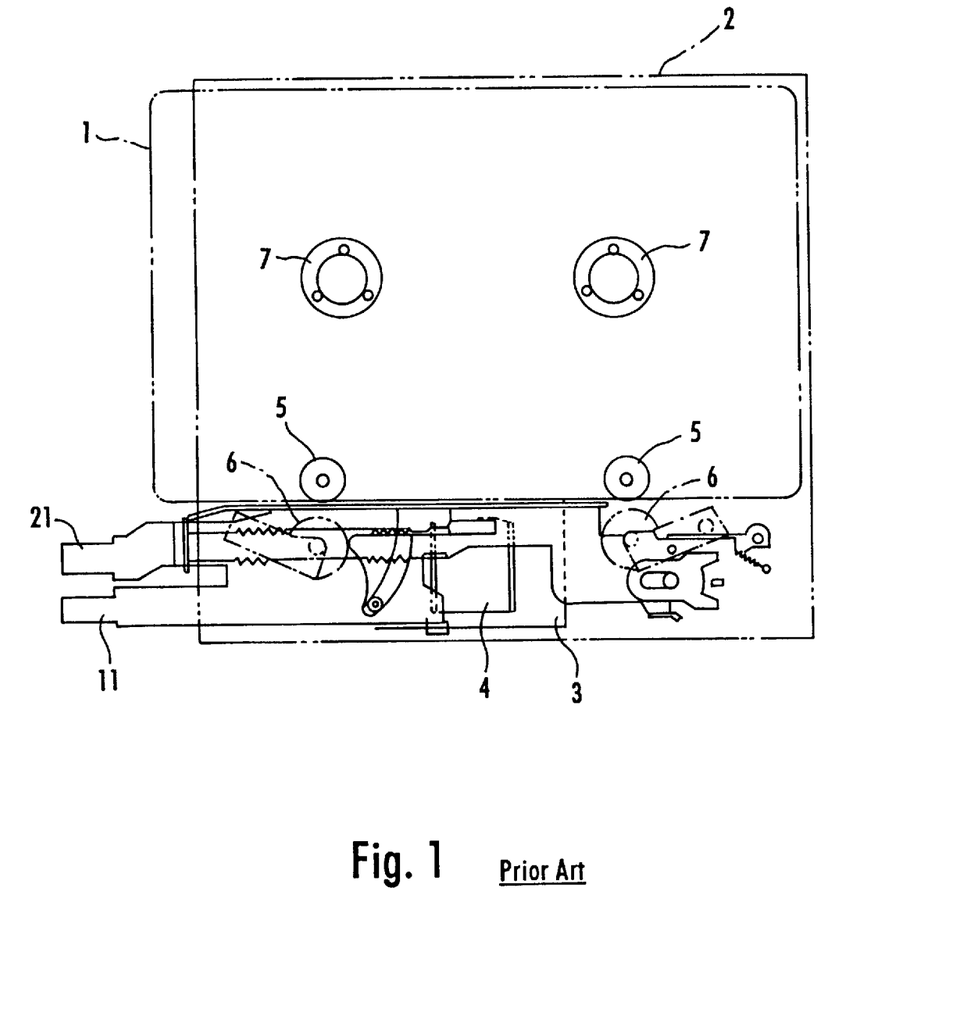
FIG. 1 is a plan view showing the mechanism of the general automatic reversible tape recorder.

This is illustrated in FIG. 1. As shown in the drawing, a head coupling piece 3 is installed upon a base plate 2 of a tape recorder 1, and a magnetic head 4 is installed in such a manner that it can advance and withdraw. At the both sides of the magnetic head 4, there are installed capstan shafts 5 which are connected to a capstan motor, and the capstan shafts 5 are contacted to pinch rollers 6 which are capable of advancing and withdrawing. About the middle portion of the tape recorder 1, there are installed reel shafts 7 for driving a tape.

Figure 2:
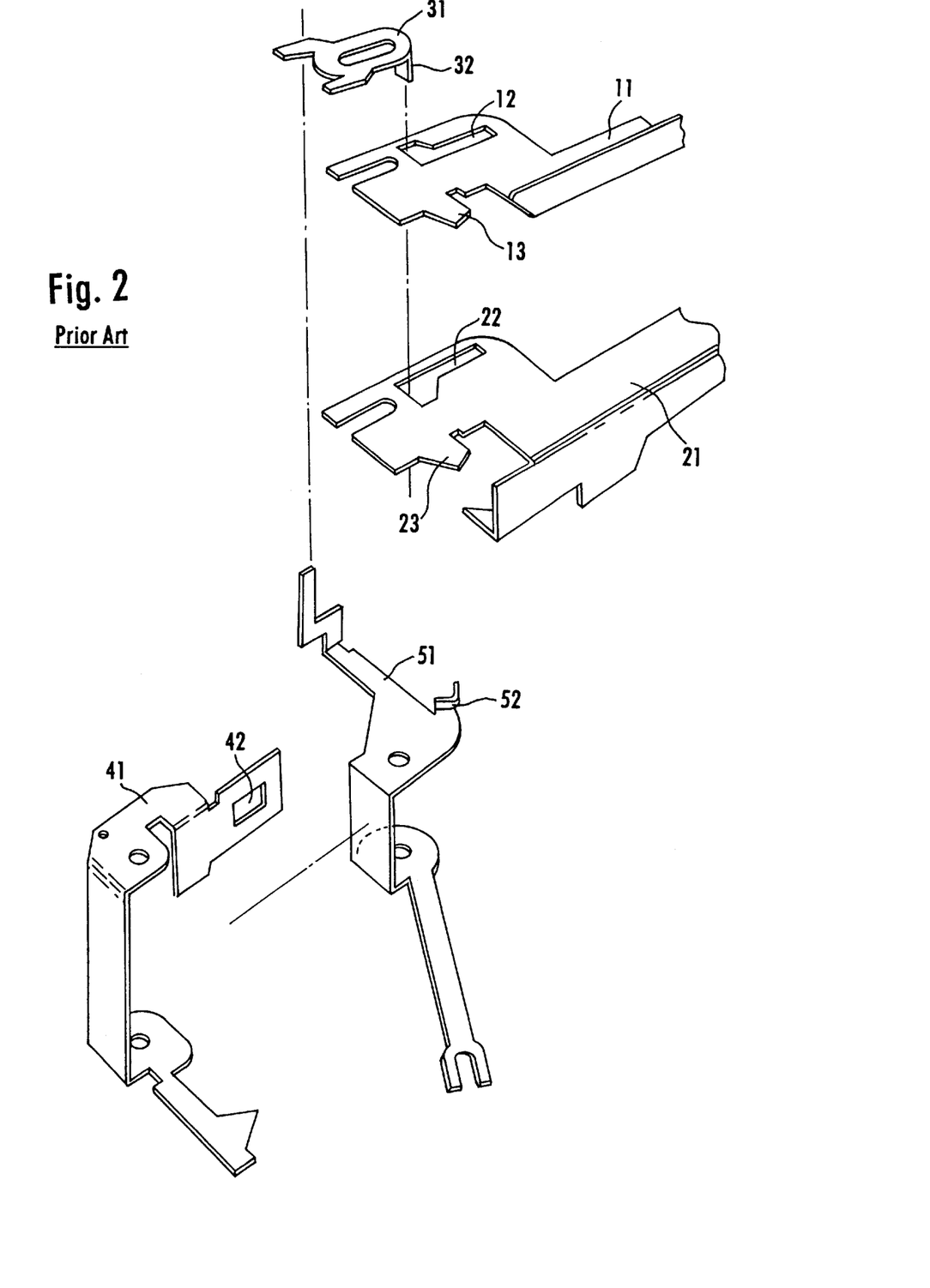
FIG. 2 is an exploded perspective view showing the critical portions of the conventional automatic reversible tape recorder.
Figure 3:
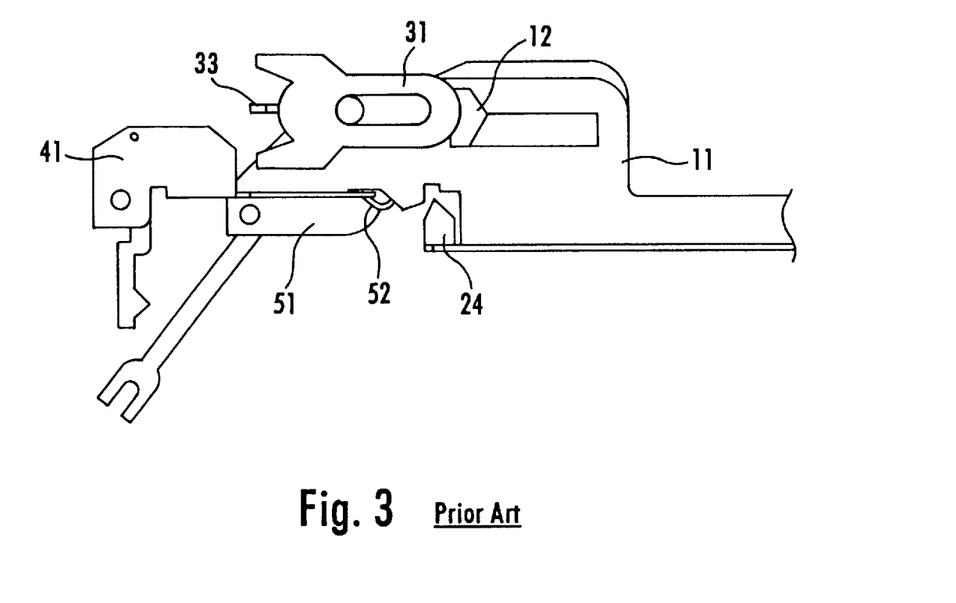
FIG. 3 illustrates the actuation of the tape recorder of FIG. 2.

Further, as shown in FIGS. 2 and 3, above the magnetic head 4 and in order to press its end, there are installed a first manipulation member (FF lever) 11 and a second manipulation member (REW lever) in an advanceable and withdrawable manner. In the front, i.e., on one side of the first manipulation member 11, there is formed a guide slot 12 for receiving a bent portion 32 of a tape direction reversing member 31. On its lower side, there is formed an engaging protuberance 13. In front, i.e., on one side of the second manipulation member 21, there is formed another guide slot 22 symmetrically with the guide slot 12 of the first manipulation member 11. On its lower side, there is formed another engaging protuberance 23, while on the pressing portion of the tape direction reversing member 31, there is formed an engaging step 33.

Further, an engaging slot 42 is formed on a lock arm 41 which is elastically supported by a spring so as to fix the engaging protuberances of the manipulation members 11 and 21. A program arm 51 is pivotally installed coaxially with the lock arm 41, and a projecting step 24 is formed on the second manipulation member 21 so as to contact with a V shaped protuberance 52.

In this automatic reversible tape recorder, in order to operate it, the first manipulation member 11 is pressed. Then the engaging protuberance 13 advances together with the first manipulation member 11. Consequently, the engaging protuberance 13 is engaged with the engaging slot 42 of the lock arm 41 which is supported elastically by the spring. Consequently, the first manipulation member 11 is fixed, while the head coupling piece 3 withdraws. Owing to the withdrawal of the head coupling piece 3, the pinch rollers 6 withdraw integrally so as to be released from the contact with the capstan shaft 5. Consequently, the rotating load due to the contact between the capstan shaft 5 and the pinch roller 6 disappears, with the result that the running velocity of the tape increases. As a result, an FF operation is executed.

Further, if the second manipulation member (REW lever) is pressed, then owing to the straight movement of the second manipulation member 21, the engaging protuberance 23 advances integrally with the second manipulation member 21. Consequently, the engaging protuberance 23 is engaged with the engaging slot 42 of the lock arm 41 which is elastically supported by the spring, and therefore, the first manipulation member 21 is fixed. Then by rotating clockwise, the first manipulation member 11 is released from the operation. Under this condition, the projecting step 24 of the second manipulation member 21 advances to pass over the V shaped protuberance 52 of the program arm 51 so as to be fixed. At the same time, the program arm is made to pivot clockwise to push a cam gear so as to reverse its rotating direction during play.

Accordingly, owing to the withdrawal of the head coupling piece 3, the pinch rollers 6 withdraw together, with the result that the contacts with the capstan shafts 5 are released. As a result, the rotating load due to the contact between the capstan shaft 5 and the pinch roller is eliminated, with the result that the running velocity of the tape increases. Consequently, the REW operation is executed in the direction opposite to that of play.

In the above described operations, that is, in the FF and REW operations, the many components are involved, and therefore, the manufacturing of the components and the assembling of them become difficult. Further, the constitution of the tape recorder becomes complicated, with the result that the price of the tape recorder is increased.

SUMMARY OF THE INVENTION

The present invention is intended to overcome the above described disadvantages of the conventional techniques.

Therefore it is an object of the present invention to provide a tape recorder for use in automobiles, in which the functions of the keys for fast forward, rewinding and reversing are improved with a simple structure, and the manufacturing and assembling of the components can be carried out in an easy manner, thereby making it possible to lower the price of the tape recorder.

In achieving the above object, the automatic reversible tape recorder according to the present invention includes:

first and second manipulation levers installed horizontally movably back and forth, for making a magnetic head ascend and descend;

a locking member for fixing the first and second manipulation levers upon completion of the vertical movement of the magnetic head owing to the advancing of the first and second manipulation levers; and a tape running direction reversing member installed coaxially with the locking member, for pivoting as much as a certain amount of angle upon completion of the advancing of the second manipulation member, and for pushing a program lever to actuate a cam gear.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 4A:
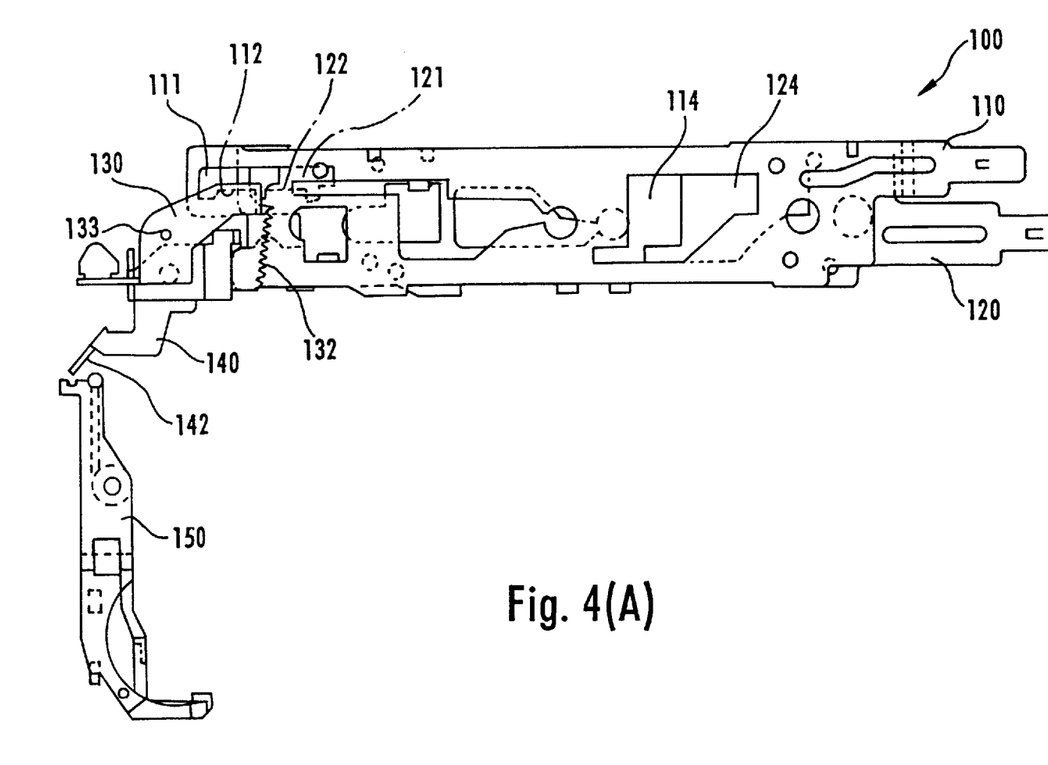
FIGS. 4A and 4B respectively illustrate the assembled state and the exploded state of the critical portions of the mechanism of the automatic reversible tape recorder according to the present invention.
Figure 4B:
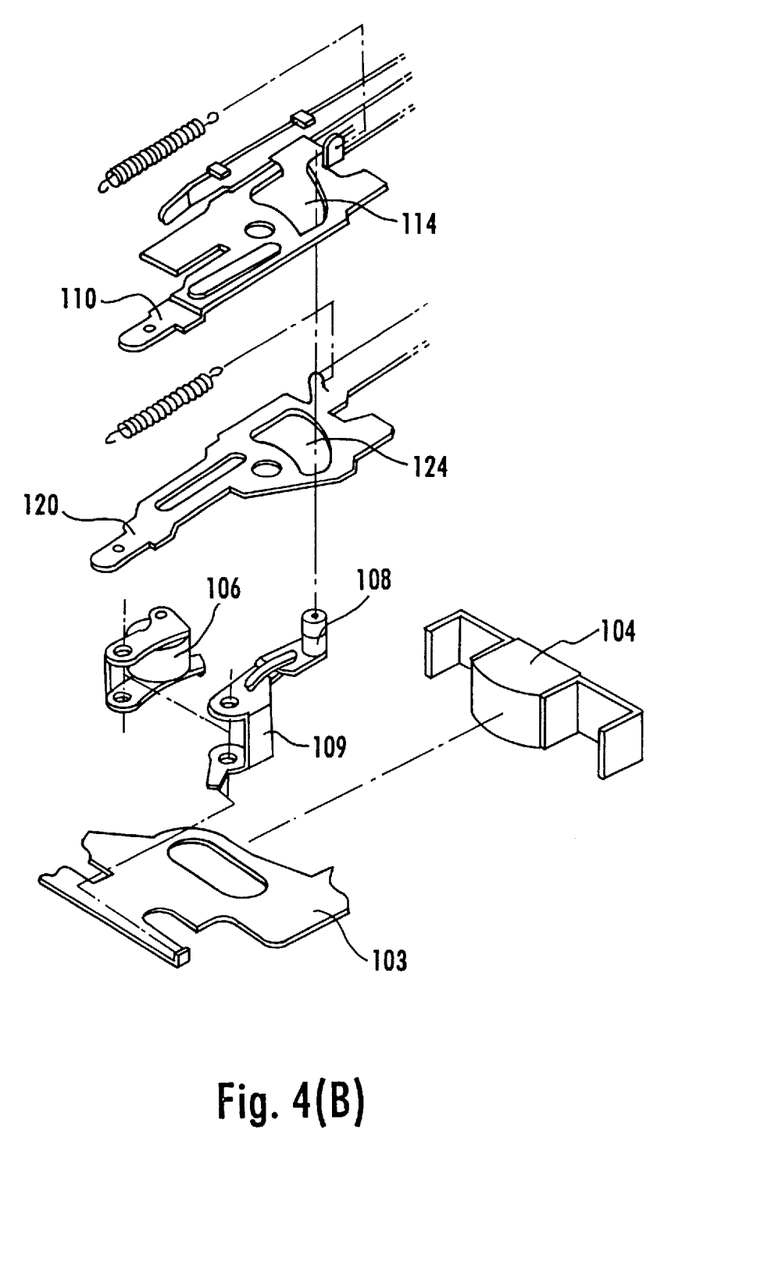
Figure 5:
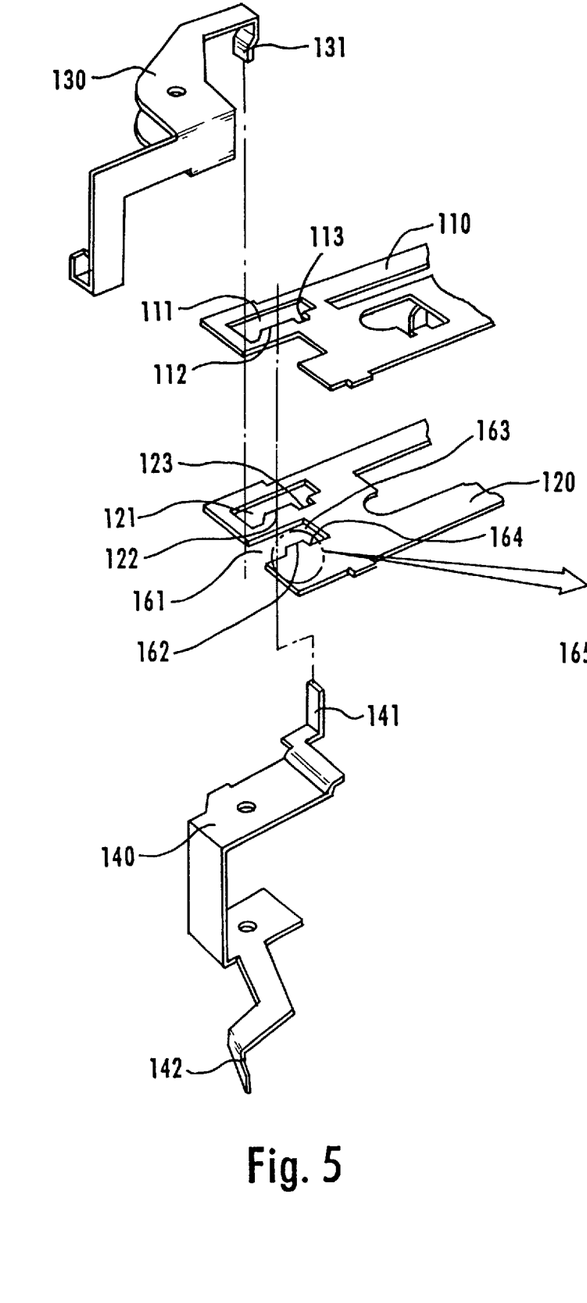
FIGS. 5–5A are an exploded perspective view showing the tape running direction reversing member for the tape recorder according to the present invention.
Figure 6:
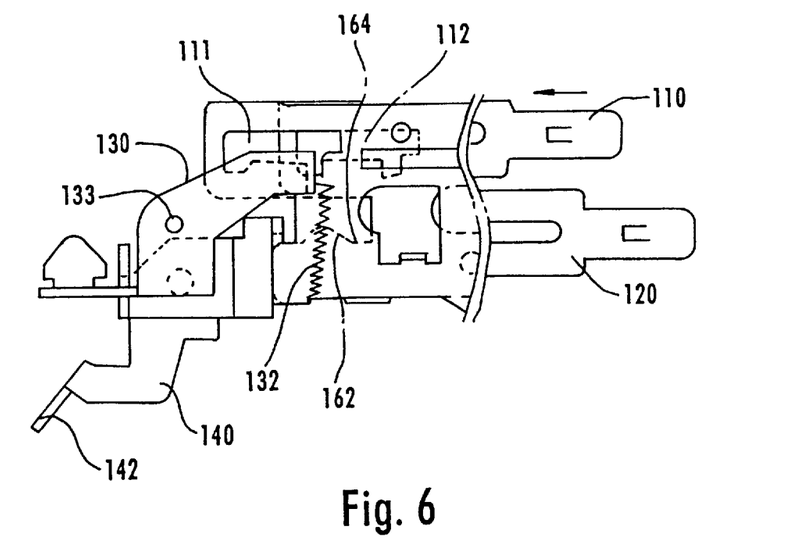
FIG. 6 illustrates the actuation of the tape recorder of FIG. 5.

FIG. 4 illustrates the assembled state and the exploded state of the critical portions of the mechanism of the automatic reversible tape recorder according to the present invention. FIGS. 5 and 6 are an exploded perspective view and an actuation showing the tape running direction reversing member of the tape recorder according to the present invention.

As shown in the drawings, a head coupling piece 103 is installed upon a base plate of a tape recorder 100, and a magnetic head 104 is installed in such a manner that it can advance and withdraw. At the both sides of the magnetic head 104, there are installed capstan shafts which are connected to a capstan motor, and the capstan shafts are contacted to pinch rollers 6 which are capable of advancing and withdrawing. About the middle portion of the tape recorder 100, there are installed reel shafts for driving a tape.

The magnetic head 104 is coupled to the head coupling piece 103, and the head coupling piece 103 is assembled with a first manipulation lever 110 and a second manipulation lever 120, in such a manner that they can move back and forth. A carrying member 109 is provided with a roller 108 which moves within guide slots 114 and 124. Owing to the pivoting of the carrying member 109, the pinch roller 106 can make the magnetic head 104 ascend and descend in the direction of crossing the manipulation levers 110 and 120.

Further, a locking member 130 is installed for fixing the first and second manipulation levers 110 and 120 upon completion of the movement (ascending or descending) of the magnetic head 104 after advancing of the first and second manipulation levers 110 and 120.

The first and second manipulation levers 110 and 120 are respectively provided with guide slots 111 and 121 on the front portions thereof, with guide protuberances 112 and 122 within the guide slots, and with engaging slots 113 and 123 at sides of the guide protuberances. Thus an upper bent end portion 131 of the locking member 130 is inserted into the guide slots 111 and 121, and then, is guided by the guide protuberances 112 and 122 so as to be engaged with the engaging slots 113 and 123, thereby locking the manipulation levers 110 and 120.

Figure 7:
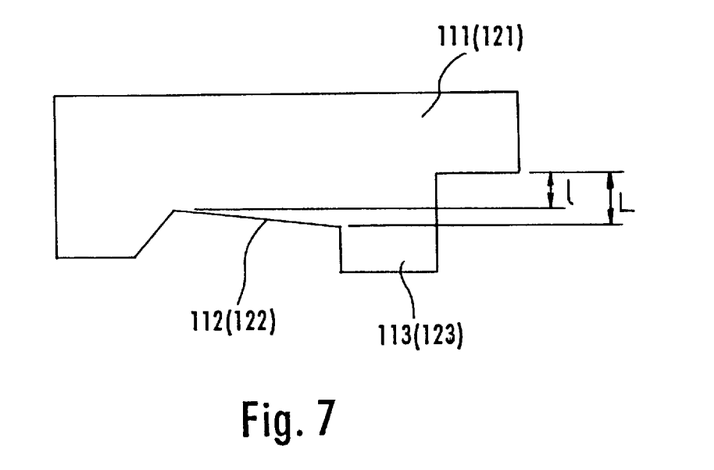
FIG. 7 illustrates the structure of the critical portions of the guide protuberance for actuating the locking member according to the present invention.

As shown in FIG. 7, the guide protuberances 112 and 122 which project within the guide slots 111 and 121 of the first and second manipulation levers 110 and 120 are designed as follows. That is, they are designed such that their front heights L≧ their rear heights I. Thus during the advancements of the manipulation levers 110 and 120, the guide protuberances 112 and 122 are smoothly engaged with the upper bent end portion 131 of the locking member 130 to fixe it.

Further, the other end of the locking member 130 is elastically connected to a spring 132.

Figure 5A:
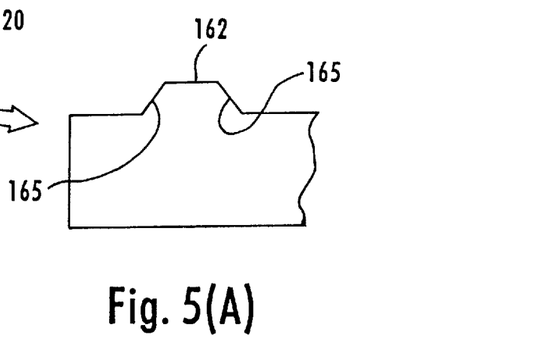

A tape running direction reversing member 140 is installed coaxially with a shaft 133 of the locking member 130. tape running direction reversing member 140 is provided with a pressing portion 141 on the upper end thereof, and with a carrying portion 142 on the lower end thereof for pushing a program lever 150 for actuating a cam gear. The second manipulation lever 120 is provided with a opening region 161 on the lower front portion thereof, so that the pressing portion 141 of the tape running direction reversing member 140 would pass through it. The inner region of the opening region 161 forms a carrying slot 163, and a protuberance 162 projects into the carrying slot 163, while an engaging slot 164 is formed at a side of the protuberance 162.

During the advancement of the second manipulation lever 120, the pressing portion 141 of the tape running direction reversing member 140 passes over the protuberance 162 within the carrying slot 163 so as to be fixed into the engaging slot 164.

Under this condition, the protuberance 162 of the second manipulation lever 120 is provided with inclined portions 165 at the both sides of it.

The mechanism of the present invention constituted as above will now be described as to its actuation.

As shown in FIGS. 4 to 6, the head coupling piece 103 is installed on the base plate of the tape recorder 100, and capstan shafts are installed at the both sides of the magnetic head 104 which is capable of moving up (advance) and down (withdraw). During an operation of play in the taper recorder, the magnetic head 104 contacts with the tape, and the pinch rollers 106 descend to contact with the capstan shafts. Thus they rotate together to carry the tape.

By selectively manipulating the first manipulation lever 110 and the second manipulation lever 120, the magnetic head 104 rotates the roller of the carrying member 109 along the guide slots 114 and 124. Owing to the pivoting of the carrying member 109, the pinch rollers 106 together with the magnetic head 104 are made to ascend or descend in the direction of crossing the manipulation levers 110 and 120.

Under a play mode of the tape recorder, in the case where the FF operation is carried out by pressing the first manipulation lever 110, the upper bent end portion 131 of the locking member 130 passes over the guide protuberance 112 of the guide slot 111 through the guide slot 111 owing to the advancement of the first manipulation lever 110, with the result that the upper bent end portion 131 is settled into the engaging slot 113 to be fixed there, thereby fixing the first manipulation lever 110 in a pressed state.

As shown in FIG. 4, one end of the locking member 130 is elastically connected to the spring 132, and therefore, the upper bent end portion 131 of the locking member 130 is engaged with the guide protuberance 112 so as to be settled into the engaging slot 113.

Therefore, the first manipulation lever 110 is fixed after advancement, and the head coupling piece 103 withdraws. When the head coupling piece 103 withdraws, the pinch roller 106 withdraws together so as to be released from the contact with the capstan shaft 105. Consequently, the rotating load due to the contact between the capstan shaft 105 and the pinch roller 106 disappears, with the result that the tape velocity increases. Consequently, the tape executes to the FF mode in the direction of play.

Meanwhile, in the case where the REW operation is carried out by pressing the second manipulation lever 120, the guide protuberance 122 of the guide slot 121 advances together owing to the advancement of the second manipulation lever 120. Thus the locking member 130 is pushed up, so that the first manipulation lever 110 would depart from the engaging slot 123.

Therefore, the first manipulation lever 110 is released, and the upper bent portion 131 of the locking member 130 which is elastically supported by the spring 132 during the advancement of the second manipulation lever 120 is locked to the second manipulation lever 120, that is, within the guide protuberance 123 of the second manipulation lever 120.

As shown in FIG. 7, the front guide slots 111 and 121 and the inner lower guide protuberances 112 and 122 of the first and second manipulation levers 110 and 120 are designed such that their heights are "the front height L≧ the rear height I". Therefore, when the manipulation levers 110 and 120 advance, they are smoothly engaged with the upper bent portion 131 of the locking member 130.

Meanwhile, the tape running direction reversing member 140 is installed coaxially with the shaft 133 of the locking member 130 in a state with the second manipulation lever 120 locked to the locking member 130. This tape running direction reversing member 140 is provided with a pressing portion 141 on the top thereof, and with a carrying portion 142 on the bottom thereof for pushing the program lever 150 (which pushes the cam gear). Therefore, the pressing portion 141 of the tape running direction reversing member 140 is inserted into the opening region 161 which is open in the front direction in the second manipulation lever 120. Then the pressing portion 141 passes over the protuberance 162 of the carrying slot 163 so as to be fixed to the engaging slot 164.

The pressing portion 141 of the tape running direction reversing member 140 is inserted into the carrying slot 163 and passes over the protuberance 162 during the advancement of the second manipulation lever 120, so as to press one end of the carrying slot 163, and so as to be engaged and fixed to the engaging slot 164. The carrying portion 142 which is formed on the bottom of the tape running direction reversing member 140 pushes the program lever 150. Thus the program lever 150 is turned as much as a certain angle, and therefore, the cam gear is driven in the opposite direction. Consequently, the tape performs a high speed rewinding operation (REW) in the direction opposite to that of play.

Under this condition, the protuberance 162 which is formed within the carrying slot 163 of the second manipulation lever 120 is provided with the inclined portions 165 on both sides thereof for a smooth passing of the pressing portion 141.

Besides the operations of play, FF and REW, in the case where the tape is manually reversed during play, the first and second manipulation levers 110 and 120 are simultaneously pushed, so that the protuberance 162 of the carrying slot 163 of the second manipulation lever 120 would push the pressing portion 141 of the tape running direction reversing member 140, thereby making it possible to reverse the running direction of the tape.

According to the present invention as described above, the functions of FF and REW are improved, and the mentioned functions are carried out in a simple manner. Further owing to the simple constitution of the direction reversing member, the price of the tape recorder can be lowered.

In the above, the present invention was described based on the specific preferred embodiments, but it should be apparent to those ordinarily skilled in the art that various changes and modifications can be added without departing from the spirit and scope of the present invention which is defined in the appended claims.

What is claimed is:

1. An automatic reversible tape recorder comprising: a head coupling piece 103 installed on a base plate of the tape recorder, for making a magnetic head 104 advance and withdraw; a pair of capstan shafts installed at both sides of said magnetic head, and connected to a capstan motor, for contacting with pinch rollers 106, said pinch rollers being capable of advancing and withdrawing together with said magnetic head 104; a reel shaft installed at a center of the tape recorder, for driving a tape; first and second manipulation levers 110 and 120 capable of moving back and forth horizontally in parallel with said head coupling piece 103; said first and second manipulation levers 110 and 120 being provided with guide slots 114 and 124 at rear portions thereof; a carrying member 109 having a roller 108 on an upper tip thereof; and said head coupling piece 103 making said magnetic head 104 and said pinch roller 106 move up or down during a pivoting of said roller 108 of said carrying member 109 along said guide slots 114 and 124, the tape recorder further comprising:

said first and second manipulation levers 110 and 120 being capable of moving back and forth horizontally to make said magnetic head ascend or descend, upon completion of displacements of a certain distance;

a locking member 130 for selectively fixing said first and second manipulation levers 110 and 120 upon ascending of said magnetic head due to advancement of said first and second manipulation levers 110 and 120; and a tape running direction reversing member 140 installed coaxially with said locking member 130, for being turned as much as a certain amount of angle upon advancing of said second manipulation lever 120, so as to push a program lever 150 (which pushes a cam gear).

2. The automatic reversible tape recorder as claimed in claim 1, wherein said first and second manipulation levers 110 and 120 are respectively provided with guide slots 111 and 121 on front portions thereof, with guide protuberances 112 and 122 within said guide slots, and with engaging slots 113 and 123 at sides of said guide protuberances.

3. The automatic reversible tape recorder as claimed in claim 1, wherein said locking member 130 is provided with an upper bent portion 131 for being inserted into said guide slots 111 and 121, for being guided by said guide protuberances 112 and 122, and for being engaged into said engaging slots 113 and 123, to lock said manipulation levers 110 and 120.

4. The automatic reversible tape recorder as claimed in claim 1 wherein said guide protuberances 112 and 122 of said first and second manipulation levers 110 and 120 are designed to be "their front heights L≧ their rear heights I".

5. The automatic reversible tape recorder as claimed in claim 1 wherein said locking member 130 is elastically installed by means of a spring 132.

6. The automatic reversible tape recorder as claimed in claim 1, wherein said tape running direction reversing member 140 installed coaxially with said locking member 130 on a shaft 133 has an upper pressing portion 141 on an upper tip thereof in an integral form, and a lower carrying portion 142 on a lower tip thereof in an integral form for pushing said program lever 150 (for pushing said cam gear).

7. The automatic reversible tape recorder as claimed in claim 1, wherein said second manipulation lever 120 is provided with an opening region 161 on a front portion thereof for receiving said pressing portion 141 of said tape running direction reversing member 140, is provided with a carrying slot 163, is provided with a protuberance 162 within said carrying slots 163, and is provided with an engaging slot 164 for fixing said pressing portion 141.

* * * * *